US009731664B2

(12) United States Patent
Fukuda et al.

(10) Patent No.: US 9,731,664 B2
(45) Date of Patent: Aug. 15, 2017

(54) CORRUGATED TUBE AND WIREHARNESS

(71) Applicant: YAZAKI CORPORATION, Tokyo (JP)

(72) Inventors: Tomohiro Fukuda, Shizuoka (JP); Hiroshi Ichikawa, Shizuoka (JP); Kazuya Takeuchi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/040,334

(22) Filed: Feb. 10, 2016

(65) Prior Publication Data
US 2016/0238166 A1    Aug. 18, 2016

(30) Foreign Application Priority Data

Feb. 18, 2015  (JP) .................................. 2015-029685
Feb. 18, 2015  (JP) .................................. 2015-029686

(51) Int. Cl.
*F16L 11/118*    (2006.01)
*B60R 16/02*    (2006.01)
(Continued)

(52) U.S. Cl.
CPC ................................ *B60R 16/0215* (2013.01)

(58) Field of Classification Search
CPC .......... H01B 7/18; H01B 7/00; H01B 7/0045; H01B 7/184; F16L 11/118; F16L 11/04;
(Continued)

(56) References Cited

U.S. PATENT DOCUMENTS 6,310,284 B1 * 10/2001 Ikeda .................... H02G 3/0468
138/121
6,321,794 B1 * 11/2001 Ishida .................... F16L 11/118
138/121
(Continued)

FOREIGN PATENT DOCUMENTS

JP          3-14921 U      2/1991
JP      2004-322583    *  4/2003
(Continued)

OTHER PUBLICATIONS

Japanese Office Action for the related Japanese Patent Application No. 2015-029685 dated Mar. 28, 2017.
(Continued)

*Primary Examiner* — Timothy Thompson
*Assistant Examiner* — Michael F McAllister
(74) *Attorney, Agent, or Firm* — Kenealy Vaidya LLP

(57) ABSTRACT

A corrugated tube made of resin includes outer grooved portions and outer ridged portions which are formed in a circumferential direction when the corrugated tube is seen from the outside. The outer grooved portions and the outer ridged portions continuously alternate in a tube-axial direction. Inner ridged portions and inner grooved portions are formed on an inner surface of the corrugated tube so as to respectively conform to the shapes of the outer grooved portions and the outer ridged portions. A cushioning portion is formed on the inner surface of the corrugated tube, and has hardness softer than that of a covering outer surface of one or multiple conductive paths accommodated in the corrugated tube.

3 Claims, 5 Drawing Sheets

(51) Int. Cl.
    *H01B 7/18*     (2006.01)
    *F16L 11/04*     (2006.01)
    *H01B 7/00*     (2006.01)

(58) Field of Classification Search
    CPC ....... F16L 11/11; F16L 57/00; B60R 16/0215;
              B29D 23/18; B32B 1/08; B32B 25/08;
              B32B 27/32; H02G 3/04; B29C 47/90;
                                  B29L 23/18
    USPC ...................................... 118/306; 174/106 D
    See application file for complete search history.

(56) References Cited

U.S. PATENT DOCUMENTS

| | | | | |
|---|---|---|---|---|
| 7,232,597 | B2 * | 6/2007 | Iwata | B32B 1/08 |
| | | | | 138/121 |
| 7,478,652 | B2 * | 1/2009 | Sakazaki | F16L 11/11 |
| | | | | 138/121 |
| 2001/0031330 | A1 * | 10/2001 | Ito | B29D 23/18 |
| | | | | 428/36.91 |
| 2004/0241368 | A1 * | 12/2004 | Iwata | B32B 1/08 |
| | | | | 428/36.91 |
| 2005/0274535 | A1 * | 12/2005 | Koike | H02G 3/0468 |
| | | | | 174/481 |
| 2011/0088944 | A1 * | 4/2011 | Ogue | B60R 16/0215 |
| | | | | 174/72 A |
| 2011/0297415 | A1 | 12/2011 | Katou et al. | |

FOREIGN PATENT DOCUMENTS

| | | | |
|---|---|---|---|
| JP | 2004-351678 | A | 12/2004 |
| JP | 2006-132586 | A | 5/2006 |
| JP | 2007-336754 | * | 6/2006 |
| JP | 2007-336754 | A | 12/2007 |
| JP | 2011-254614 | A | 12/2011 |

OTHER PUBLICATIONS

Japanese Office Action for the related Japanese Patent Application No. 2015-029686 dated Mar. 28, 2017.

* cited by examiner

CORRUGATED TUBE AND WIREHARNESS

CROSS-REFERENCES TO RELATED APPLICATION(S)

This application is based on and claims priority from Japanese Patent Application Nos. 2015-029685 and 2015-029686 both filed on Feb. 18, 2015, the entire contents of which are incorporated herein by reference.

BACKGROUND

Field of the Invention

The present invention relates to a corrugated tube made of resin including bellows-like grooved portions and bellows-like ridged portions, and to a wireharness including the corrugated tube.

Description of Related Art

A wireharness used for electrical connection is routed in a vehicle such as an automobile. A wireharness which is a bundle of thin electric wires is widely known. In recent years, a wireharness for an electric vehicle or a hybrid electric vehicle, which is formed of thick high-voltage electric wires, has also been known. The wireharness may include an electric-wire protective corrugated tube. The corrugated tube is formed to include bellows-like grooved portions and bellows-like ridged portions such that the bellows-like grooved portions and the bellows-like ridged portions continuously alternate in a tube-axial direction.

A corrugated tube disclosed in JP-A-2011-254614 has a structure in which the corrugated tube is not damaged when a relatively hard electric wire cover strikes an inner surface of the corrugated tube due to transmission of vibration to a wireharness during travelling of a vehicle. The corrugated tube includes two layers, that is, an inner layer and an outer layer. According to the corrugated tube, even if the electric wire cover has hardness higher than that of the corrugated tube, an inner-layer corrugated tube, which is interposed between an outer-layer corrugated tube and the electric wire cover, serves as a cushioning member. As a result, damage to the outer-layer corrugated tube can be prevented.

It is required to provide a corrugated tube which is useful even when an electric wire cover has hardness softer than that of the corrugated tube. In other words, it is required to provide a corrugated tube with a structure in which an electric wire cover is not damaged, and degradation in a quality of the electric wire cover caused by friction or contact between the corrugated tube and the electric wire cover does not occur even when an electric wire vibrates while striking an inner surface of the corrugated tube.

Corrugated tubes with the structures illustrated in FIGS. 4 and 5 were examined, as related technology products. The corrugated tubes with the structures illustrated in FIGS. 4 and 5 do not correspond to prior art of the present invention.

In FIG. 4, a corrugated tube 1 includes outer grooved portions 2 and outer ridged portions 3. The multiple outer grooved portions 2 and multiple outer ridged portions 3 are formed in such a way as to continuously alternate in a tube-axial direction. Inner ridged portions 4 and inner grooved portions 5 are formed in an inner surface of the corrugated tube 1 so as to respectively conform to shapes of the outer grooved portions 2 and the outer ridged portions 3. A cushioning member 8 is disposed and formed on the inner surface of the corrugated tube 1 such that the cushioning member 8 is interposed between a covering outer surface 7 of an electric wire (conductive path) 6 and the inner surface of the corrugated tube 1. The cushioning member 8 is made of a material which is relatively soft and has low frictional resistance. The cushioning member 8 is formed in such a way as to cover the inner ridged portions 4 and the inner grooved portions 5, and to completely cover the inner grooved portions 5.

Since the corrugated tube 1 has a structure in which the soft cushioning member 8 having low frictional resistance is interposed between the covering outer surface 7 of the electric wire 6 and the corrugated tube 1, even if the electric wire 6 vibrates, it is possible to prevent damage to the covering outer surface 7. Degradation in the quality of the covering outer surface 7 caused by friction or contact therebetween can also be prevented.

In contrast, since the corrugated tube 1 has the structure in which the inner grooved portions 5 are completely covered with the cushioning member 8, even if the corrugated tube 1 is to be bent, the cushioning member 8 is not bent unless being extended or contracted. As a result, the corrugated tube 1 in FIG. 4 has a problem in that the tube's own flexibility is reduced.

In FIG. 5, a corrugated tube 11 includes outer grooved portions 12 and outer ridged portions 13. The multiple outer grooved portions 12 and the multiple outer ridged portions 13 are formed in such a way as to continuously alternate in a tube-axial direction. Inner ridged portions 14 and inner grooved portions 15 are formed in an inner surface of the corrugated tube 11 so as to respectively conform to the shapes of the outer grooved portion 12 and the outer ridged portion 13. A tube 18 is disposed and formed on the inner surface of the corrugated tube 11 such that the tube 18 is interposed between a covering outer surface 17 of an electric wire (conductive path) 16 and the inner surface of the corrugated tube 11. The tube 18 is fixedly attached to, and is formed integrally with the inner ridged portions 14 in such a way that the tube 18 does not strike the inner ridged portions 14. The tube 18 is relatively flexible, and is formed such that an inner tube surface is smooth.

Since the corrugated tube 11 has a structure in which the flexible tube 18 having a smooth inner surface is interposed between the covering outer surface 17 of the electric wire 16 and the corrugated tube 11, even if the electric wire 16 vibrates, it is possible to prevent damage to the covering outer surface 17. Degradation in the quality of the covering outer surface 17 caused by friction or contact therebetween can also be prevented.

In contrast, since the corrugated tube 11 has the structure in which the tube 18 is fixedly attached to the inner ridged portions 14, even if the corrugated tube 11 is to be bent, the tube 18 is stiff and is not bent. As a result, in the corrugated tube 11 in FIG. 5, the tube's own flexibility is reduced.

SUMMARY

One or more embodiments relate to a corrugated tube which does not cause damage to a covering outer surface of a conductive path by vibration, and degradation in a quality of the covering outer surface caused by friction or contact therebetween does not occur. One or more embodiments also relates to a wireharness including the corrugated tube.

DETAILED DESCRIPTION

Figure 1:
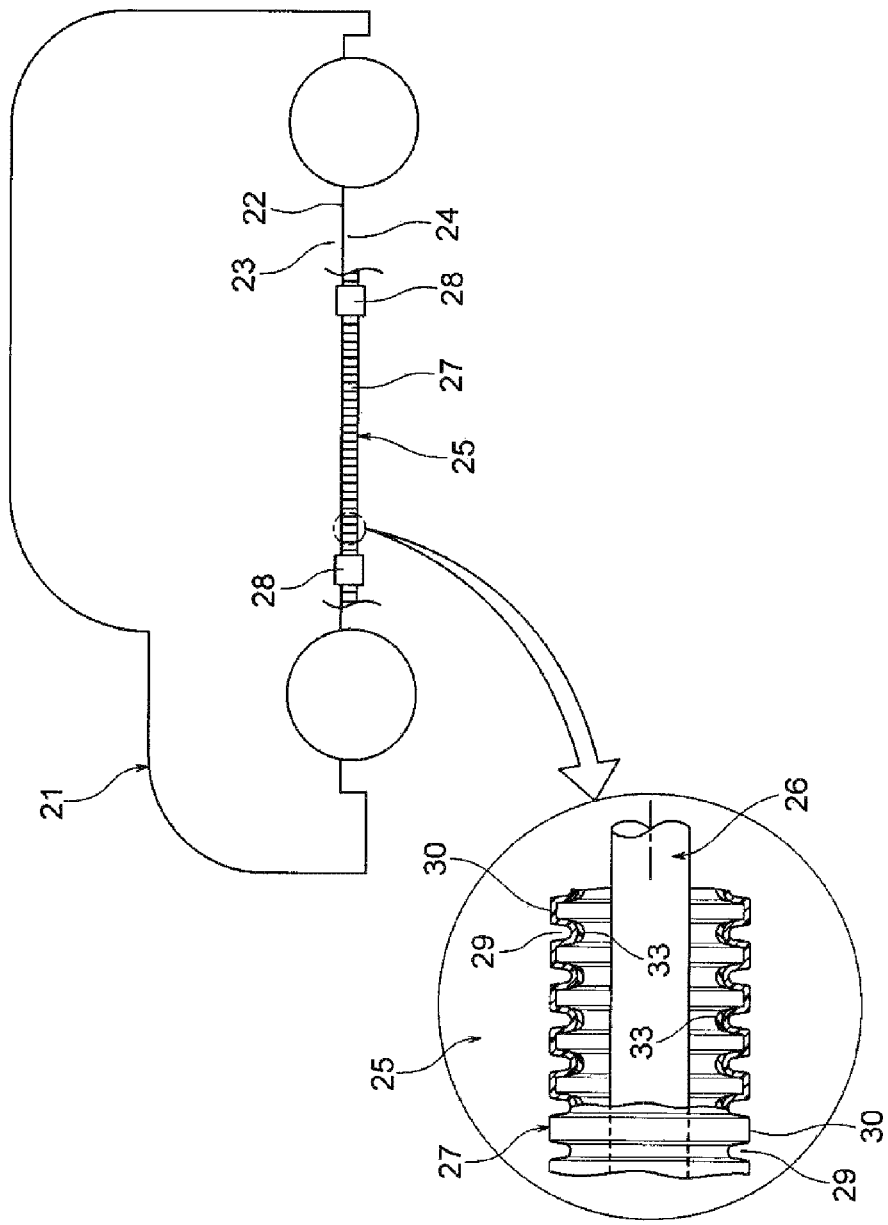
FIG. 1 is a schematic view illustrating an example of a routing of a wireharness including a corrugated tube of embodiments.

Embodiments will be described with reference to the accompanying drawings. FIG. 1 is a schematic view illustrating an example of the routing of a wireharness including a corrugated tube in embodiments (including a first embodiment and a second embodiment).

Hereinafter, an example, in which the corrugated tube in embodiments is applied to a wireharness routed in a hybrid electric vehicle (may be an electric vehicle, a usual automobile which travels using driving power from an engine, or the like) will be described.

In FIG. 1, reference sign 21 represents a hybrid electric vehicle. The hybrid electric vehicle 21 is a vehicle driven by driving power from a combination of two power sources, that is, an engine and a motor. Electrical power is supplied from a battery to the motor via an inverter unit. Reference sign 22 represents a vehicle frame. An upper side of the vehicle frame 22 represents a vehicle upperfloor portion 23, and a lower side of the vehicle frame 22 represents a vehicle underfloor portion 24.

In the embodiments, a wireharness 25 is routed on the vehicle underfloor portion 24 (the routing position is an example, and the wireharness 25 may be routed on the vehicle upperfloor portion 23). The wireharness 25 is routed in a position where vibration is transmitted to the wireharness 25.

The wireharness 25 includes one or multiple conductive paths 26; a corrugated tube 27 which is made of resin, and accommodates and protects the conductive paths 26; and a fixing member 28 fixing the corrugated tube 27 to the vehicle underfloor portion 24.

As one example, the conductive path 26 may include a conductor having electrical conductivity, and an insulator having electrical insulating properties, with which the conductor is covered. The conductor may be made of copper, a copper alloy, aluminum, or an aluminum alloy, and has a circular sectional shape. As another example, the conductive path 26 may include: an insulated wire made up of a conductor having electrical conductivity and an insulator having electrical insulating properties; a braid (shielding member) provided on an outside of the insulated wire; and a sheath with which the braid is covered. In a case where the conductive path 26 includes the conductor having electrical conductivity, and the insulator having electrical insulating properties for covering the conductor, an outer surface of the insulator corresponds to a "covering outer surface". In a case where the conductive path 26 includes: the insulated wire made up of the conductor having electrical conductivity and the insulator having electrical insulating properties; the braid (shielding member) provided on the outside of the insulated wire; and the sheath for covering the braid, an outer surface of the sheath corresponds to the "covering outer surface".

The conductor may have either a conductor structure in which wire strands are twisted together, or a bar-shaped conductor structure (for example, a conductor structure in which the conductor is a single flat square-shaped core or a single round core, and in this case, an electrical wire also has a bar shape) in which a sectional shape of the conductor is rectangular or circular (round). The insulator made of a resin material having electrical insulting properties is extrusion-molded over an outer surface of the conductor.

The insulator is extrusion-molded over the outer circumferential surface of the conductor with a thermoplastic resin material. The insulator is formed as a covering member which may have a circular sectional shape. The insulator is formed to have a predetermined thickness. Various types of well-known materials can be used as the thermoplastic resin, and for example, the material of the insulator is appropriately selected from high-polymer materials such as polyvinylchloride resin, polyethylene resin, and polypropylene resin.

The braid is an electromagnetic shielding metal component (shielding member counteracting electromagnetic waves), and is formed by weaving together a number of metal wire strands into a cylindrical shape.

The sheath is extrusion-molded on the braid with thermoplastic resin material. The sheath is formed as a covering member. The sheath is formed to have a predetermined thickness. Various types of well-known materials can be used as the thermoplastic resin, and for example, the material of the sheath is appropriately selected from high-polymer materials such as polyvinylchloride resin, polyethylene resin, and polypropylene resin. The sheath may be replaced with a well-known heat shrinkable tube.

The corrugated tube 27 is formed into a tubular shape having a circular section (the sectional shape is an example, and the corrugated tube 27 may have an oval sectional shape, an elliptical sectional shape, or the like corresponding to the shape of the conductive path 26 or the number of conductive paths 26). The corrugated tube 27 is formed into the illustrated shape when seen from an outside, and includes outer grooved portions 29 and outer ridged portions 30 in a circumferential direction. The corrugated tube 27 is formed into the illustrated shape in which the outer grooved portions 29 and the outer ridged portions 30 continuously alternate in a tube-axial direction (refer to a central line CL).

In the embodiments, the corrugated tube 27 is formed not to include a slit in the tube-axial direction (formed into a shape in which the belly of the tube is not split). In other words, the corrugated tube 27 is formed into a shape capable of preventing an infiltration of external water thereinto.

The outer grooved portions 29 are formed in valley portions of the corrugated tube 27 when seen from an outside. The outer ridged portions 30 are formed in peak portions of the corrugated tube 27 when seen from the outside. More specifically, each of the outer grooved portions 29 is formed in a valley-like portion in which a groove having a U-shaped section makes one turn around the tubular axis in the circumferential direction. Each of the outer ridged portions 30 is formed in a peak-like portion in which a ridge having an inverted cup-shaped section makes one turn around the tubular axis in the circumferential direction. The shape of the each of the outer ridged portion 30 is not limited to the illustrated shape, and an inverted U-shaped ridged portion may be formed as the outer ridged portion 30. The respective sectional shapes of the outer grooved portion 29 and the outer ridged portion 30 in the embodiments are exemplarily given.

Inner ridged portions 31 and inner grooved portions 32 are formed in an inner surface of the corrugated tube 27 so as to respectively conform to the shapes of the outer grooved portions 29 and the outer ridged portions 30. As illustrated, each of the inner ridged portions 31 is formed into a ridged shape when the corrugated tube 27 is seen from the inside. The inner ridged portions 31 are disposed at axial positions of the outer grooved portion 29. Each of the inner grooved portions 32 is formed into a grooved shape when the corrugated tube 27 is seen from the inside. The inner grooved portions 32 are disposed at axial positions of the outer ridged portions 30. One or more cushioning portions 33 are formed on the inner surface of the corrugated tube 27.

Figure 2:
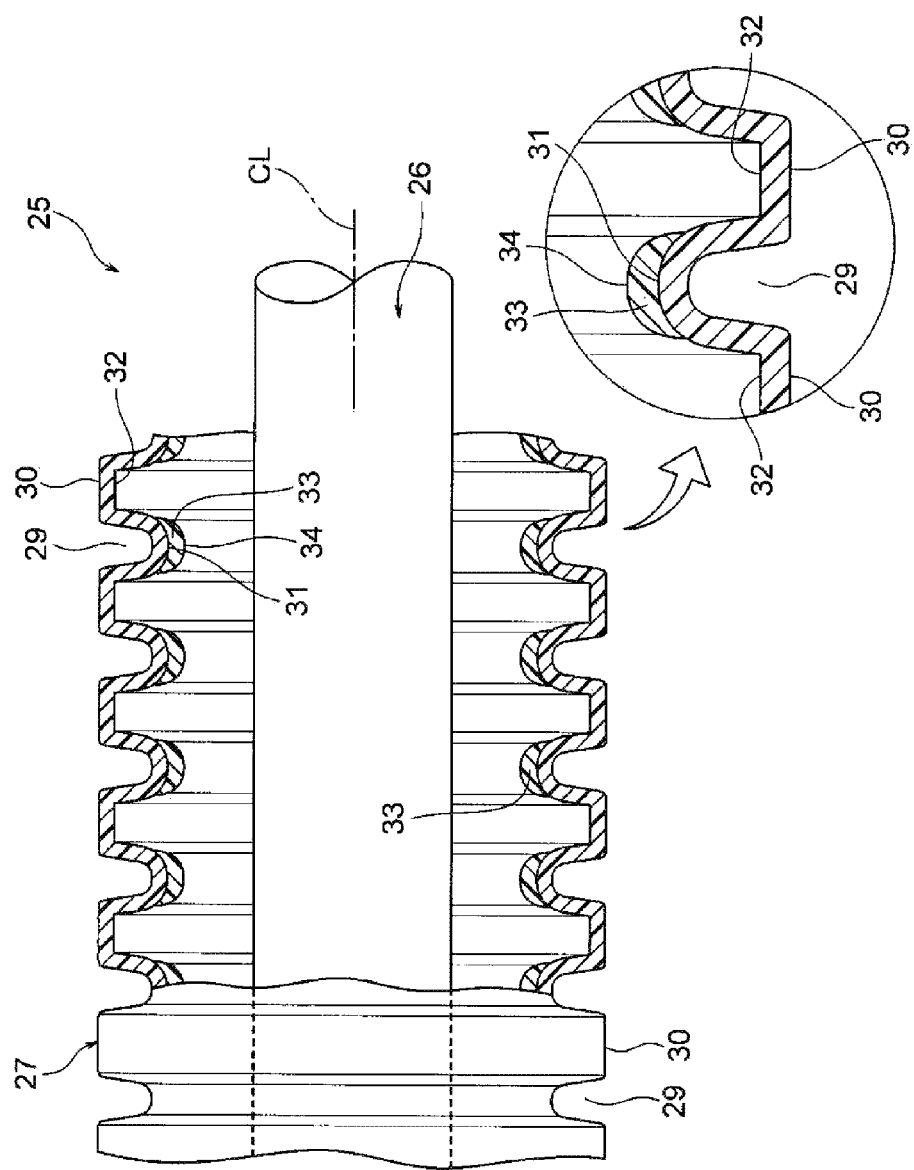
FIG. 2 is a side view (including a partial section) of a wireharness of a first embodiment.

As illustrated in FIG. 2, in the first embodiment, the cushioning portions 33 are formed only in apex portions of the inner ridged portions 31 on the inner surface of the corrugated tube 27. Each of the cushioning portions 33 having substantially uniform thickness is formed to make one turn in the circumferential direction (that is, the each of the cushioning portions 33 is formed into an annular shape). When the portion of reference sign 34 in each of the cushioning portions 33 represents a contact surface which can be brought into contact with an insulator outer surface (covering outer surface) of the conductive path 26 or a sheath outer surface (covering outer surface), the contact surface 34 of the cushioning portion 33 is smoothly rounded. Since the cushioning portions 33 are formed only in the apex portions of the respective inner ridged portions 31, the original shape of the respective inner grooved portions 32 are maintained in the cushioning portions 33.

The each of the cushioning portion 33 is formed as a portion having hardness softer than that of the covering outer surface of the conductive path 26. Any one of the following materials can be used as the specific material of the cushioning portions 33: polyolefin resin; polyamide resin; vinyl chloride resin; silicone resin; fluorine resin; polycarbonate resin; polyimide resin; polyester resin; polyurethane resin; and the like. A foaming agent may also be added to the material. The each of the cushioning portion 33 preferably has a thickness of 1 $\mu$m to 500 $\mu$m (the thickness of the cushioning portion 33 is exaggeratedly illustrated in FIG. 2).

The cushioning portions 33 are formed by extrusion-molding the aforementioned material, or applying the aforementioned material to the inner ridged portion 31 (the manufacturing method is not limited to a specific method).

For a little more detailed description of the application of the material, first, a columnar or cylindrical bar is prepared, and subsequently, the material of the cushioning portions 33 is attached to an outer surface of the bar except for a handle of the bar. Subsequently, the material is applied to only the apex portions by inserting the bar into the corrugated tube 27, and rotating the bar while the material is in contact with the apex portions of the inner ridged portions 31. Thereafter, the material is hardened, and as a result, the formation of the cushioning portions 33 is complete.

According to the corrugated tube 27 of the first embodiment, since the soft cushioning portions 33 are formed only in the apex portions of the inner ridged portions 31, the original shape of the inner grooved portions 32 can be maintained. That is, since the inner grooved portions 32 are not coated with the cushioning portion 33, the corrugated tube 27 can be easily bent. Accordingly, the corrugated tube 27 is capable of maintaining its own flexibility.

According to the corrugated tube 27 of the first embodiment, since the each of the contact surfaces 34 of the cushioning portions 33 is smoothly rounded, an occurrence of degradation in a quality of the covering outer surface caused by friction or contact between the covering outer surface of the conductive path 26 and the each of the contact surfaces 34 can be prevented, or degradation in the quality of the covering outer surface can be considerably reduced.

As a result, according to the first embodiment, it is possible to provide the corrugated tube 27 in which the covering outer surface of the conductive path 26 is not damaged during vibration of the conductive path 26, and the occurrence of degradation in the quality of the covering outer surface caused by friction or contact between the corrugated tube 27 and the covering outer surface is prevented, and to provide the wireharness 25 including the corrugated tube 27.

Figure 3:
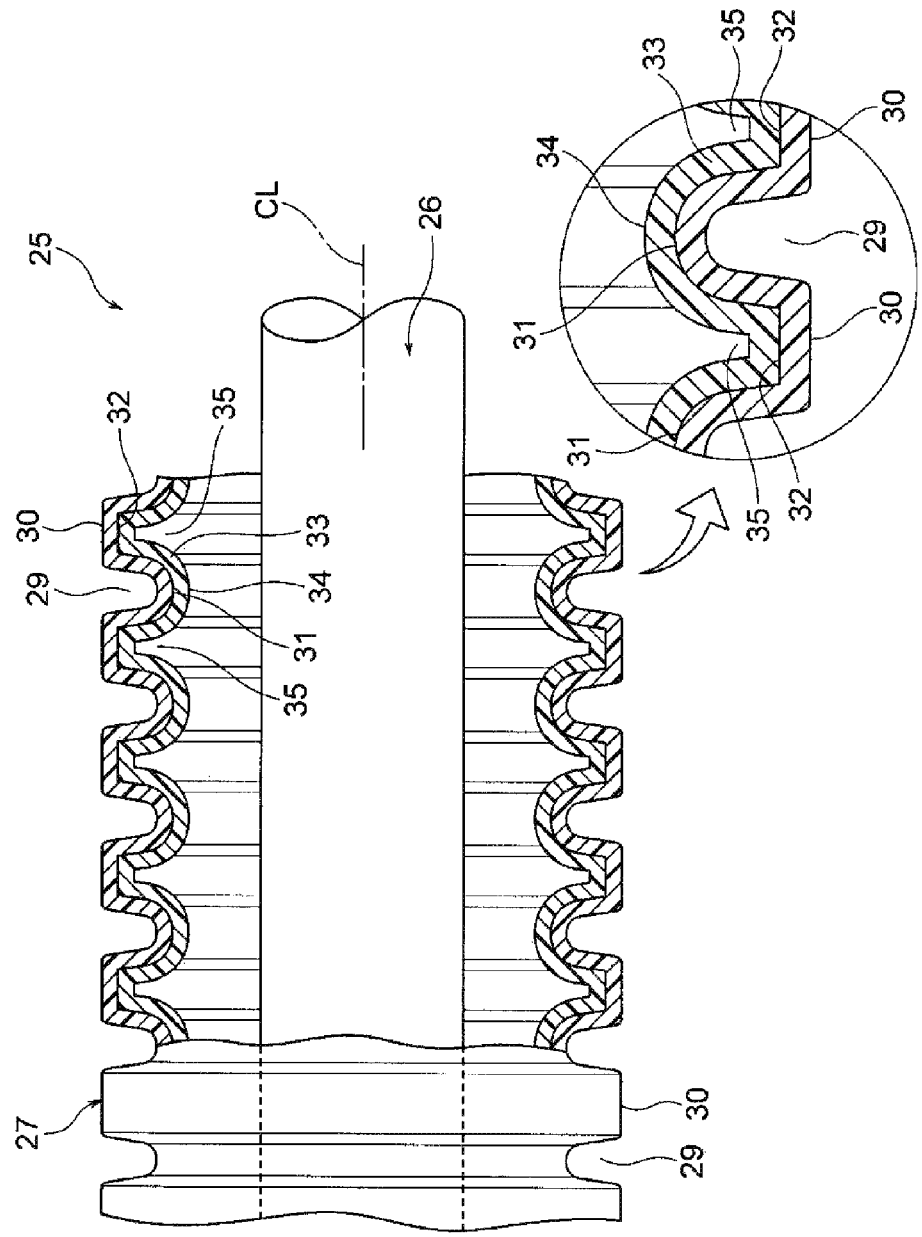
FIG. 3 is a side view (including a partial section) of a wireharness of a second embodiment.
Figure 4:
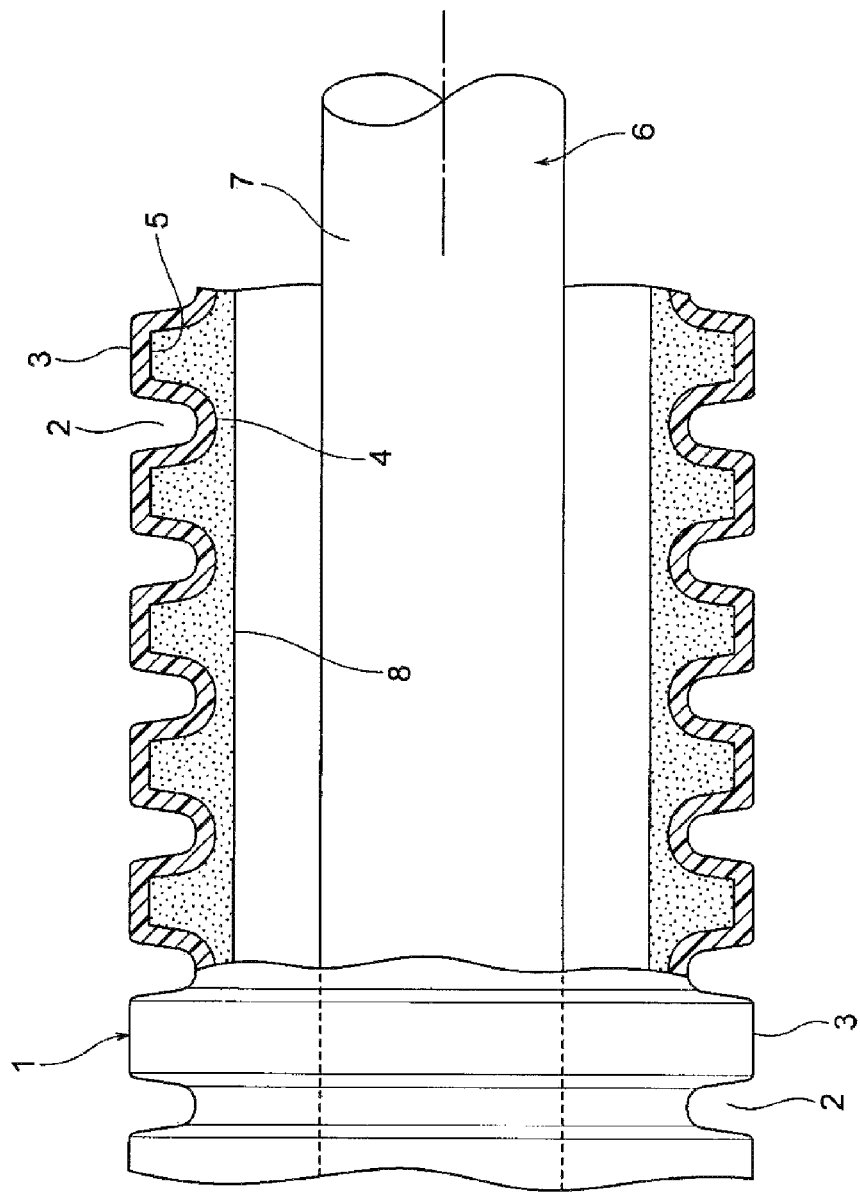
FIG. 4 is a view illustrating a corrugated tube in a related technology.
Figure 5:
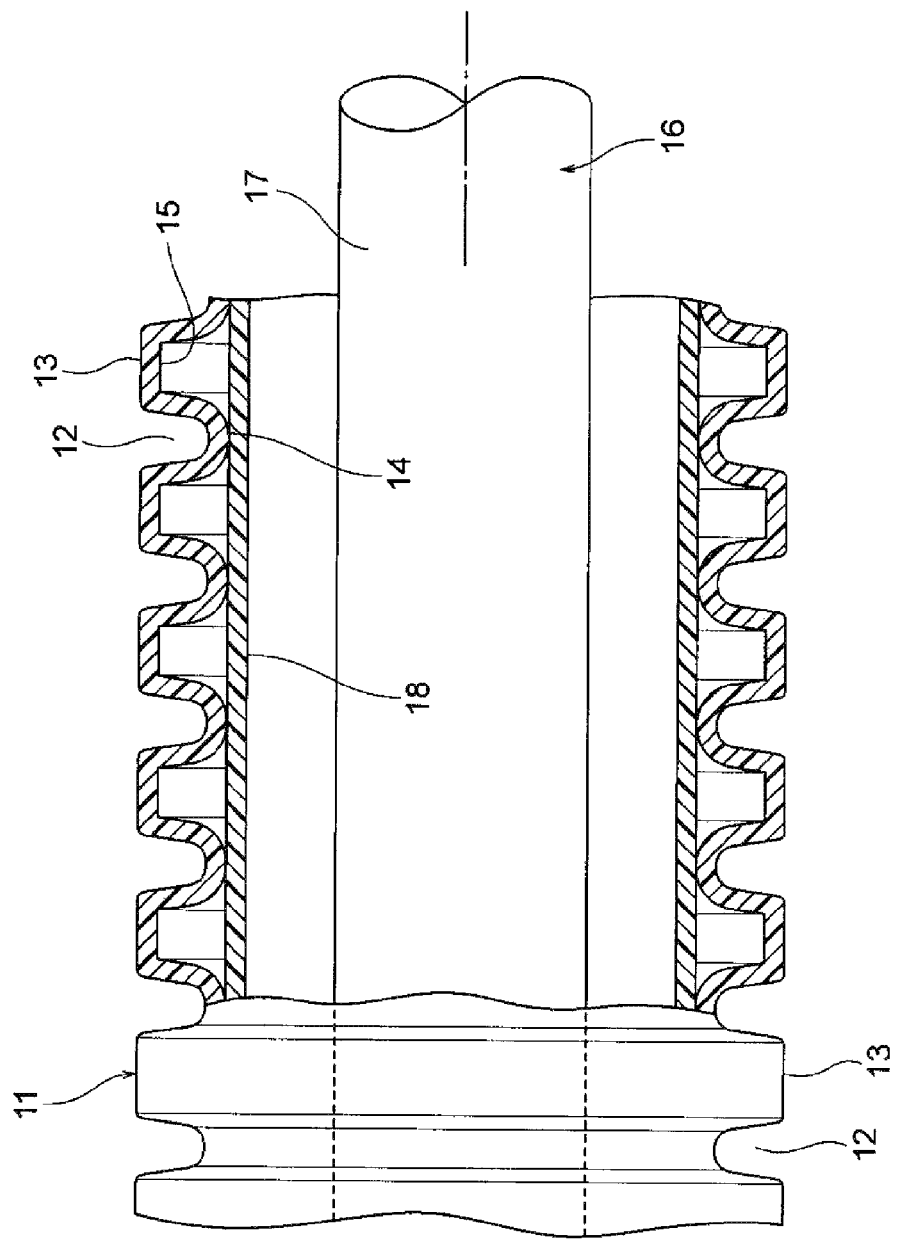
FIG. 5 is a view illustrating a corrugated tube in a related technology.

The second embodiment will be described with reference to FIG. 3. The cushioning portion 33 in the second embodiment is integrally formed along the inner surface of the corrugated tube 27. When a portion of reference sign 34 represents a contact surface which can be brought into contact with the insulator outer surface (covering outer surface) of the conductive path 26 or the sheath outer surface (covering outer surface), the cushioning portion 33 having a substantially uniform thickness is integrally formed along the corrugated tube 27 in such a way that the contact surface 34 becomes a surface conforming to the ridged shapes of the inner ridged portions 31 and the grooved shapes of the inner grooved portions 32 (the thickness is only an example, and the cushioning portion 33 may have a thicker thickness at the positions of the inner ridged portions 31, and a thinner thickness at the positions of the inner grooved portions 32).

Since the contact surface 34 is formed to conform to the ridged shapes of the inner ridged portions 31 and the grooved shapes of the inner grooved portions 32, the cushioning portion 33 includes extendable and contractible grooved portions 35 which make one turn in the circumferential direction. That is, the cushioning portion 33 is formed into a shape in which the inner grooved portions 32 are not filled with the cushioning portion 33. The contact surface 34 of the cushioning portion 33 is smoothly formed at least at the positions of the inner ridged portions 31. In the second embodiment, the contact surface 34 is smoothly rounded at the positions of the inner ridged portions 31.

The cushioning portion 33 is formed to have hardness softer than that of the covering outer surface of the conductive path 26. Any one of the following materials may be used as the specific material of the cushioning portion 33: polyolefin resin; polyamide resin; vinyl chloride resin; silicone resin; fluorine resin; polycarbonate resin; polyimide resin; polyester resin; polyurethane resin; and the like. A foaming agent may also be added to the material. The cushioning portion 33 preferably has a thickness of 1 $\mu$m to 100 $\mu$m (the thickness of the cushioning portion 33 is exaggeratedly illustrated in FIG. 3).

The cushioning portion 33 is formed by extrusion-molding the aforementioned material, or applying the aforementioned material to the inner surface of the corrugated tube 27 (the manufacturing method is not limited to a specific method).

For a little more detailed description of the molding, a two-layer extrusion molding machine with a crosshead, and a die for forming waves, which is disposed in front of a nozzle of the two-layer extrusion molding machine, are prepared, and molding is performed. The die for forming waves is configured to be opened and closed in a direction perpendicular to a material extrusion direction. After a material is extruded from the nozzle of the two-layer extrusion molding machine to have a tubular shape in which an outer layer serving as the body of the corrugated tube 27 overlaps an inner layer serving as the cushioning portion 33, a tubular extruded article is formed into a bellows-like tubular shape by the die for forming waves. That is, the tubular extruded article is finally formed into a bellows-like tubular shape by pressing the tubular extruded article against, or vacuum-suctioning the tubular extruded article to wave-shaped grooves of the die inside the die for forming waves.

According to the corrugated tube 27 of the second embodiment, since the soft cushioning portion 33 is formed along the inner surface of the corrugated tube 27, and the contact surface 34 of the cushioning portion 33 is formed into a ridged and grooved shape, the extendable and contractible grooved portions 35 can be circumferentially formed in the cushioning portion 33 at the positions corresponding to the inner grooved portions 32. That is, since the inner grooved portions 32 is not completely filled with the cushioning portion 33, the corrugated tube 27 can be easily bent. Accordingly, the corrugated tube 27 is capable of maintaining its own flexibility.

According to the corrugated tube 27 of the second embodiments, since the contact surface 34 of the cushioning portion 33 is smoothly formed, the occurrence of degradation in the quality of the covering outer surface caused by friction or contact between the covering outer surface of the conductive path 26 and the contact surface 34 can be prevented, or degradation in the quality of the covering outer surface can be considerably reduced.

As a result, according to the second embodiment, it is possible to provide the corrugated tube 27 in which the covering outer surface is not damaged during vibration of the conductive path 26, and the occurrence of degradation in the quality of the covering outer surface caused by friction or contact between the corrugated tube 27 and the covering outer surface is prevented, and to provide the wireharness 25 configured to include the corrugated tube 27.

According to the embodiments, the corrugated tube 27 made of resin is formed into a shape in which, when the corrugated tube 27 is seen from the outside, the outer grooved portions 29 and the outer ridged portions 30 are formed in the circumferential direction, the outer grooved portions 29 and the outer ridged portions 30 continuously alternate in the tube-axial direction, and the inner ridged portions 31 and the inner grooved portions 32 are formed on the inner surface of the corrugated tube 27 so as to respectively conform to the shapes of the outer grooved portions 29 and the outer ridged portions 30.

The corrugated tube 27 may include the cushioning portion 33 that has hardness softer than that of the covering outer surface of the one or the multiple conductive paths 26 accommodated and protected by the corrugated tube 27, and is integrally formed only in the apex portion of the inner ridged portion 31.

According to this structure, it is possible to provide a corrugated tube in which the covering outer surface of the conductive path is not damaged during vibration of the conductive path.

The contact surface 34 of the cushioning portion 33 may be smoothly rounded.

According to this structure, it is possible to provide a corrugated tube in which the occurrence of degradation in the quality of the covering outer surface of the conductive path caused by friction or contact between the corrugated tube and the covering outer surface is prevented.

The wireharness 25 may include the corrugated tube 27 with the aforementioned structure, and the one or the multiple conductive paths 26 accommodated and protected by the corrugated tube 27.

According to this structure, it is possible to provide a wireharness configured to include a corrugated tube in which the covering outer surface is not damaged during vibration of the conductive path, and the occurrence of degradation in the quality of the covering outer surface caused by friction or contact between the corrugated tube and the covering outer surface is prevented.

According to this structure, since the soft cushioning portions are formed only in the apex portions of the inner ridged portions, the original shapes of the inner grooved portions are maintained. That is, since the inner grooved portions are not coated with the cushioning portion, the corrugated tube can be easily bent, and, as a result, flexibility of the corrugated tube is not reduced. Since the contact surfaces of the cushioning portions are smoothly rounded, the occurrence of degradation in the quality of the covering outer surface caused by friction or contact between the covering outer surface of the conductive path and the contact surface is prevented, or degradation in the quality of the covering outer surface is considerably reduced.

According to embodiments, the corrugated tube 27 may include the cushioning portion 33 that has hardness softer than that of the covering outer surface of the one or the multiple conductive paths 26 accommodated and protected by the corrugated tube 27, and is integrally formed along the inner surface of the corrugated tube 27. The cushioning portion 33 may include the contact surface 34 conforming to the ridged shapes of the inner ridged portions 31 and the grooved shapes of the inner grooved portions 32.

According to this structure, it is possible to provide a corrugated tube in which the covering outer surface of one or multiple conductive path is not damaged during vibration of the conductive path.

The contact surface 34 may be smoothly formed at least at the positions of the inner ridged portions 31.

According to this structure, it is possible to provide a corrugated tube in which the occurrence of degradation in the quality of the covering outer surface of one or multiple conductive path caused by friction or contact between the corrugated tube and the covering outer surface is prevented.

The wireharness 25 may include the corrugated tube 27 with the aforementioned structure, and the one or the multiple conductive paths 26 accommodated and protected by the corrugated tube 27.

According to this structure, it is possible to provide a wireharness configured to include a corrugated tube in which the covering outer surface of one or multiple conductive path is not damaged during vibration of the conductive path, and the occurrence of degradation in the quality of the covering outer surface caused by friction or contact between the corrugated tube and the covering outer surface is prevented.

According to this structure, since the soft cushioning portion is formed along the inner surface of the corrugated tube, and the contact surface of the cushioning portion is formed into a ridged and grooved shape, the grooved portions (extendable and contractible grooved portions) are circumferentially formed at the positions corresponding to the inner grooved portions. That is, since the inner grooved portions are not filled with the cushioning portion, the corrugated tube can be easily bent, and, as a result, flexibility of the corrugated tube is not reduced. Since the contact surface of the cushioning portion is smoothly formed, the occurrence of degradation in the quality of the covering outer surface of one or multiple conductive paths caused by friction or contact between the covering outer surface and the contact surface is prevented, or degradation in the quality of the covering outer surface is considerably reduced.

The present invention is not limited to the above embodiments, and the present invention may be modified in various forms insofar as the modifications do not depart from the purport of the present invention.

DESCRIPTION OF REFERENCE NUMERALS AND SIGNS

21: HYBRID ELECTRIC VEHICLE
22: VEHICLE FRAME
23: VEHICLE UPPERFLOOR PORTION
24: VEHICLE UNDERFLOOR PORTION
25: WIREHARNESS
26: CONDUCTIVE PATH
27: CORRUGATED TUBE
28: FIXING MEMBER
29: OUTER GROOVED PORTION
30: OUTER RIDGED PORTION
31: INNER RIDGED PORTION
32: INNER GROOVED PORTION
33: CUSHIONING PORTION
34: CONTACT SURFACE
35: EXTENDABLE AND CONTRACTIBLE GROOVED PORTION

What is claimed is:

1. A corrugated tube which is made of resin, and is formed into a shape in which, when the corrugated tube is seen from the outside, outer grooved portions and outer ridged portions are provided in a circumferential direction, the outer grooved portions and the outer ridged portions continuously alternate in a tube-axial direction, and inner ridged portions and inner grooved portions are formed on an inner surface of the corrugated tube so as to respectively conform to shapes of the outer grooved portions and the outer ridged portions, the corrugated tube comprising:

cushioning portions formed in apex portions of the respective inner ridged portions such that each of the cushioning portions terminates at a location spaced away from the inner grooved portion that abuts the inner ridged portion of the respective apex portion, wherein each of the cushioning portions has a hardness softer than a hardness of a covering outer surface of one or multiple conductive paths accommodated in the corrugated tube.

2. The corrugated tube according to claim 1, wherein a contact surface of each of the cushioning portions to be contact with the covering outer surface of the one or the multiple conductive paths is smoothly rounded.

3. A wireharness comprising:
the corrugated tube according to claim 1; and
the one or the multiple conductive paths accommodated and protected by the corrugated tube.

* * * * *